Patented June 4, 1946

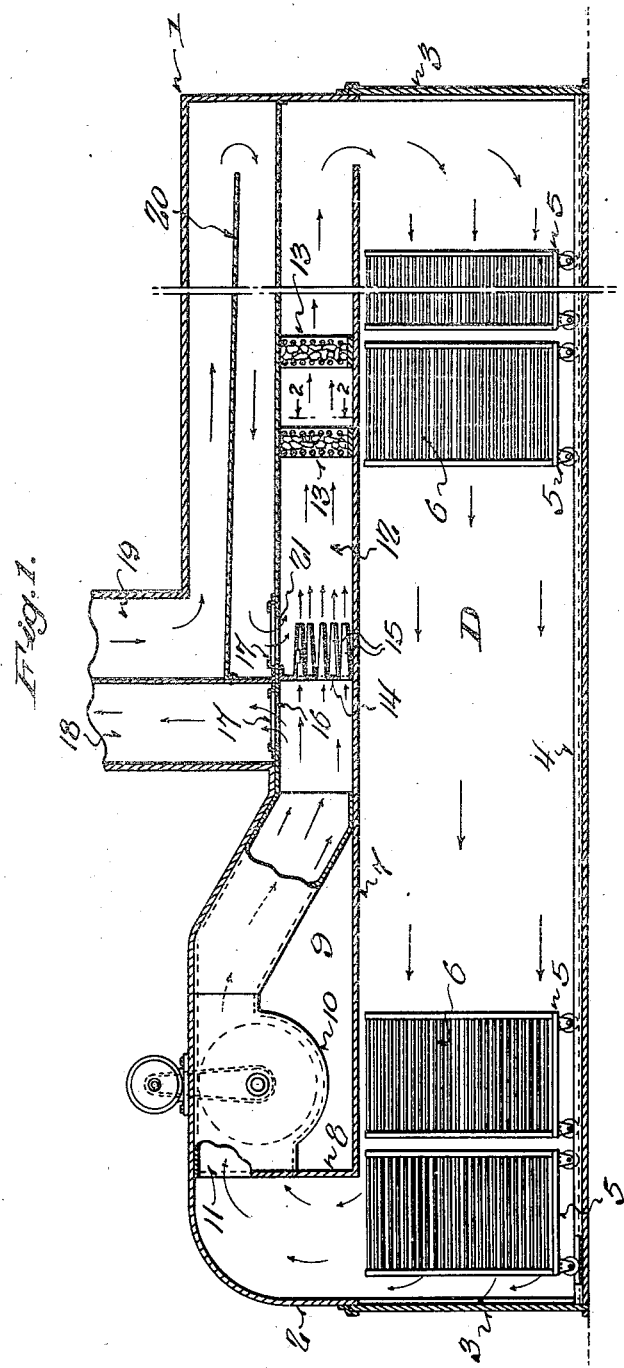
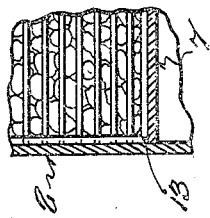

2,401,493

UNITED STATES PATENT OFFICE 2,401,493

METHOD FOR DEHYDRATING FOODS

Friedericke W. MacPherran, Milwaukee, Wis., and Charles C. MacPherran, deceased, late of Milwaukee, Wis., by Nancy Ann Van Ells, administratrix, Milwaukee, Wis., assignors to Nancy Ann Van Ells, Milwaukee, Wis.

Application June 9, 1945, Serial No. 598,486

2 Claims. (Cl. 99—199)

The present invention pertains generally to dehydration of food products such as fruit, vegetables, meat, fish, and is a substitute for applicants' prior case, Serial No. 396,135, filed May 31, 1941.

The invention has primarily for its object to improve present dehydrating methods and apparatus, whereby all desirable ingredients are retained in the food, and the final product is reduced to a concentrated condition in a complete state of preservation, capable of restoration to its normal condition.

Incidental to the foregoing, a more specific object of the invention resides in treating food products under conditions of relatively low temperature, and in the presence of products of combustion from charcoal, which serves as a color preservation and effects complete destruction of live organisms to prevent fermentation or mold.

With the above and other objects in view, which will appear as the description proceeds, the invention resides in the novel method, construction, combination and arrangement of parts, substantially as hereinafter described, and more particularly defined by the appended claims, it being understood that such changes in the precise embodiment of the herein disclosed invention may be made as come within the scope of the claims.

In the accompanying drawing is illustrated one complete example of the physical embodiment of the present invention constructed according to the best mode so far devised for the practical application of the principles thereof.

In the drawing:

Figure 1 is a longitudinal sectional view of a forced draft dehydrator incorporating the principle of the present invention; and Figure 2 is an enlarged fragmentary section taken on the line 2—2 of Figure 1, illustrating a portion of one of the charcoal braziers.

While commercial dehydration of food is still in a state of development, some of the principles involved are well known, and accepted by authorities and experts in the art. Therefore, it is considered unnecessary to enter into a detail discussion of the same, in view of which, the description of the present method and apparatus will be confined to only those conditions affected by the present invention.

Considering the method first, it is well recognized that in the practical dehydration of food, the material must be dried below the enzyme stage uniformly from center to surface. In utilizing the term "drying" throughout the specification and claims, it is to be understood that the same is employed in its restricted sense, designating desiccation or humidifying, and not mere drying of the material, which results in mutilation or rupture of the cell walls, and consequently prevents restoration of the material to its normal state.

To accomplish the purpose of the invention, the material is first cleaned and prepared in the same manner that it would be prepared for ordinary cooking, after which it is severed into pieces of uniform size and thickness, which insures uniform drying of the particles.

After preparing the material, the same is placed in a saline solution varying in strength to suit the requirements of the particular product being treated, and it is important that the solution be brought to the same temperature as that of the material.

Inasmuch as it is desirable to retain the natural color of dehydrated products, in order that they may be subsequently restored to their normal appearance, it is proposed to add a small portion of sodium carbonate ($Na_2CO_3$) to the saline solution.

The material may be left in the solution for a considerable period of time, approximately two or three hours without detrimental effect, which results in adding moisture to the material to retard and prevent too rapid extraction of moisture from the material during initial subjection to the drying process. Also the added moisture prevents checking of the surface or superficial cells, and the formation of a glazed "skin dry" surface to prevent the inner cells from liberating their moisture, leaving them subject to enzymic action. Throughout the entire initial treatment of the material, which is in a state of nascence, outside influences should be guarded against, such as direct daylight, particularly sunlight.

After the material is removed from the saline solution, which has been gradually brought to the same temperature as the air to which the material is to be subjected, it is spread upon trays, preferably made of wire mesh, and placed in the dehydrator.

At the time the material is placed in the dehydrator, a film of the saline solution is retained and forms a cover to ensure against oxidation during the initial drying treatment. Circulation of air is then initiated at a relatively low rate of travel of approximately four feet per second, depending upon the type of material being treated, and the initial temperature of the circulation of air should not exceed 115° Fahrenheit. This creates a state of osmosis, which not only hastens evaporation of the water, but allows its liberation with minimum effect upon the desirable ingredients contained in the material.

During the initial period of drying, as for example, the first hour, moisture is introduced into the circulated air, and thereafter, its humidity is gradually decreased to the desired degree, which usually requires approximately one hour and a half.

One of the important features of the present method resides in subjecting the material during treatment of the products of combustion from charcoal, which includes carbon dioxide ($CO_2$), carbon monoxide ($CO$), and a small portion of sulphur dioxide ($SO_2$), which have no detrimental effects upon the flavor or texture of the material, but serve as insecticides and color preservatives.

The above process is continued until the material reaches a leathery state, in which moisture cannot be squeezed out of the ends or freshly cut edges. When the material has reached the foregoing condition, the temperature of the circulated air is gradually increased, not to exceed 135° Fahrenheit at any time, inasmuch as it has been found that high temperatures, or too long a period of subjection to heat, results in actual drying or cooking of the material, with resultant rupture of the cell walls.

When the treatment has been continued for a sufficient period of time to bring the material to a brittle state in which it can be broken, it is removed from the dehydrator and placed in a well ventilated room at moderate temperature and secured against the entrance of insects and the like. During the foregoing process, the water content of the material is sufficiently reduced to prevent fermentation or mold. However, sufficient moisture is retained in the product to permit its restoration to normal condition by subsequent addition of water.

The moisture content of the dried products may vary widely in different materials, some being able to carry as high as 20% of moisture, while others are unable to retain more than 5%, always assuming that the product must be in a proper condition of preservation under ordinary conditions. In the event that it is desired to reduce the material to powdered form, the moisture left in the same is relatively lower than in whole pieces. Reducing material to powdered form is accomplished by passing the same through a grinder after it has reached a brittle state.

Finally the ground material is promptly packed in tight containers, due to the fact that in powdered form most material is hygroscopic, and therefore, subject to cake if exposed to atmosphere.

Referring now to the drawing, the numeral 1 designates generally a forced draft dehydrator comprising an elongated casing 2, provided at its opposite ends with doors or closure 3. The bottom of the casing 2, which constitutes a drying compartment D, is provided at its opposite ends with doors or closure 3. The bottom of the casing 2, which constitutes a drying compartment D, is provided with longitudinal tracks 4, upon which trucks 5 equipped with spaced racks 6 for the reception of trays, preferably formed of wire mesh and containing the material to be treated, are mounted. The trucks 5 are introduced into the cabinet at its forward end, which in the drawing is at the lefthand side of Figure 1, and during the dehydrating process the trucks are moved gradually toward the rear, or righthand side of the casing and removed through the closure 3.

A horizontal longitudinal partition 7 terminating in an end wall 8 spaced from the forward end of the casing 2, forms an upper compartment 9 above the drying compartment D. Mounted in the compartment 9 is a motor driven impeller casing 10 provided with an inlet 11 communicating with the forward end of the drying compartment. The outlet end of the impeller casing communicates with an air passage or duct 12 through which air is circulated and introduced at the rear end of the drying compartment through which it is circulated in the direction indicated by arrows and returned to the impeller casing 10.

Positioned within the duct 12 is a pair of spaced conventional charcoal braziers 13, which may be charged through the sides of the casing 2, or in any other suitable manner. Consequently, air passing through the duct 12 will come in contact with the burning charcoal causing the same to be heated and mixed with the products of combustion with the charcoal for the purpose explained in connection with the method description.

In addition to the foregoing, the present method of heating the circulated air results in material operating economy, in that the heating medium is entirely contained within the casing 2 and the air is heated by direct contact with the fuel, rather than by radiation.

Inasmuch as it is desirable to recirculate only a predetermined amount of heated air, the duct 12 is provided with a partition 14, that carries a plurality of spaced nozzles 15, which forms an obstruction to the forced circulation from the impeller, and consequently, creates an increased pressure on the forward side of the partition, which is employed to expel air through an opening 16 formed in the top of the duct 2 and controlled by a slide plate 17. The opening 16 provides communication between the duct and a discharge flue 18.

To compensate for displacement of air discharged through the flue 18, an inlet flue 19 is positioned above the duct 12 and divided by a longitudinal partition 20 terminating in spaced relation to the rear wall of the casing 2, thus causing the incoming air to travel over an elongated circuitous path, after which it enters the duct 12 through an opening 21 formed in the top of the duct at the rear of the partition 14, the opening 21 also being controlled by a slidable plate 17.

Obviously, due to the action of the nozzles 15, which increases the velocity of air at that particular position in the duct, an injector action results, which serves to draw air from the duct which masses with the rear circulated air forced through the nozzles 15, thus permitting accurate control over both temperature and humidity of air circulated through the braziers and dehydrating compartment.

Obviously, humidity of the fresh air introduced into the dehydrator can be increased if desired by introducing moisture into the same in any conventional manner, and as a matter of fact, the present apparatus may be readily adapted to automatic control by means of a hygrometer to eliminate the human factor.

From the foregoing explanation considered in connection with the accompanying drawing, it will be apparent that a simple method and apparatus have been devised for the most practical and inexpensive commercial dehydration of foods, whereby their desired ingredients, normal texture and appearance are retained to allow complete restoration.

What is claimed is:

1. The method of dehydrating food consisting of cleaning and preparing the food as for cooking, then severing the same into particles of uniform size and thickness, next soaking the material in a solution of salt (NaCl) and sodium carbonate ($Na_2CO_3$) of substantially the same temperature as the material, removing the material from said solution and subjecting the same to circulated heated air at relatively low temperature, containing products of combustion from a charcoal burner to impregnate the heated air with carbon dioxide, carbon monoxide and sulphur dioxide to preserve the color of the food product, gradually increasing the temperature of said air and reducing its humidity until sufficient moisture has been liberated from the material through the absorption of said air to reduce the material to a leathery state from which no moisture can be squeezed, and then placing the material in a room of moderate temperature sealed against entrance of insects and until such time as the temperature of the material is reduced to atmospheric temperature.

2. The method of dehydrating food consisting of cleaning and preparing the food as for cooking, then severing the same into particles of uniform size and thickness, next soaking the material in a solution of salt (NaCl) and sodium carbonate ($NaCO_3$) at substantially the same temperature as the material, removing the material from said solution and subjecting the same to circulated heated air at approximately 115° Fahrenheit, the heated air being impregnated with the product of combustion including carbon dioxide, carbon monoxide and sulphur dioxide, whereby the color of the product is preserved.

FRIEDERICKE W. MacPHERRAN.
NANCY ANN VAN ELLS,
*Administratrix for the Estate of Charles C. MacPherran, Deceased.*